United States Patent
Almuhaidib

(10) Patent No.: US 11,635,539 B2
(45) Date of Patent: Apr. 25, 2023

(54) IMAGING SHALLOW HETEROGENEITIES BASED ON NEAR-SURFACE SCATTERED ELASTIC WAVES

(71) Applicant: Saudi Arabian Oil Company, Dhahran (SA)

(72) Inventor: Abdulaziz Mohammad Almuhaidib, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 429 days.

(21) Appl. No.: 15/144,461

(22) Filed: May 2, 2016

(65) Prior Publication Data

US 2016/0320506 A1 Nov. 3, 2016

Related U.S. Application Data

(60) Provisional application No. 62/155,207, filed on Apr. 30, 2015, provisional application No. 62/155,053, filed on Apr. 30, 2015.

(51) Int. Cl.
*G01V 1/30* (2006.01)
*G01V 1/36* (2006.01)
*G01V 1/28* (2006.01)

(52) U.S. Cl.
CPC .............. *G01V 1/306* (2013.01); *G01V 1/282* (2013.01); *G01V 1/362* (2013.01); *G01V 1/364* (2013.01); *G01V 2210/322* (2013.01); *G01V 2210/324* (2013.01); *G01V 2210/44* (2013.01); *G01V 2210/47* (2013.01); *G01V 2210/624* (2013.01)

(58) Field of Classification Search
None
See application file for complete search history.

(56) References Cited

U.S. PATENT DOCUMENTS

| | | |
|---|---|---|
| 4,562,540 A | 12/1985 | Devaney |
| 4,694,438 A | 9/1987 | Sengupta |
| 4,760,563 A * | 7/1988 | Beylkin ................... G01V 1/32 367/43 |
| 4,766,574 A | 8/1988 | Whitmore, Jr. et al. |
| 5,894,092 A * | 4/1999 | Lindgren ............. G01N 29/041 73/598 |
| 6,125,698 A | 10/2000 | Schweitzer |
| 6,553,315 B2 | 4/2003 | Kerekes et al. |

(Continued)

OTHER PUBLICATIONS

Brown et al., "A simplified Procedure to Measure Average Shear-wave Velocity to a Depth of 30 Meters (VS30)", 12WCEE (2000): pp. 1-8.*

(Continued)

*Primary Examiner* — Michele Fan
(74) *Attorney, Agent, or Firm* — Fish & Richardson P.C.

(57) ABSTRACT

Scattered body waves are isolated to primary, shear, and surface waves as a receiver wavefield from recorded near-surface scattered wave data generated by scatters. The isolated receiver wavefield is backward propagated through an earth model from a final to an initial state. A source wavefield and the receiver wavefields are cross-correlated. A source wavefield and the receiver wavefields are stacked, over all time steps and sources, to generate a subsurface image. A display of the subsurface image is initiated.

20 Claims, 12 Drawing Sheets
(6 of 12 Drawing Sheet(s) Filed in Color)

(56) References Cited

U.S. PATENT DOCUMENTS

| | | | |
|---|---|---|---|
| 6,791,901 B1* | 9/2004 | Robertsson | G01V 1/20 367/58 |
| 8,233,351 B2 | 7/2012 | Levin | |
| 8,953,411 B2 | 2/2015 | Shin | |
| 9,052,407 B2 | 6/2015 | Jing et al. | |
| 9,105,075 B1 | 8/2015 | Yu | |
| 9,594,176 B1 | 3/2017 | Popovici | |
| 9,933,533 B2* | 4/2018 | Dellinger | G01V 1/282 |
| 2005/0024990 A1* | 2/2005 | Laake | G01V 1/003 367/38 |
| 2006/0098529 A1* | 5/2006 | Anderson | G01V 1/28 367/38 |
| 2009/0005992 A1* | 1/2009 | Alumbaugh | G01V 3/30 702/7 |
| 2009/0005993 A1* | 1/2009 | Abubakar | G01V 11/00 702/7 |
| 2009/0157320 A1* | 6/2009 | Abubakar | G01V 3/38 702/11 |
| 2010/0186950 A1 | 7/2010 | Neelamani | |
| 2011/0120724 A1* | 5/2011 | Krohn | G01V 1/30 166/369 |
| 2011/0295510 A1 | 12/2011 | Gulati | |
| 2012/0051182 A1* | 3/2012 | Shin | G01V 1/28 367/59 |
| 2012/0095689 A1 | 4/2012 | Kostov | |
| 2012/0143511 A1* | 6/2012 | Halliday | G01V 1/364 702/17 |
| 2012/0253683 A1* | 10/2012 | Edme | G01V 1/303 702/18 |
| 2013/0003500 A1* | 1/2013 | Neelamani | G01V 1/28 367/73 |
| 2013/0028051 A1* | 1/2013 | Barkved | G01V 1/288 367/40 |
| 2013/0064431 A1* | 3/2013 | Winbow | G01V 1/282 382/109 |
| 2013/0215717 A1* | 8/2013 | Hofland | G01V 1/306 367/59 |
| 2013/0265851 A1* | 10/2013 | Faber | G01V 1/42 367/25 |
| 2014/0022861 A1* | 1/2014 | Edme | G01V 1/36 367/38 |
| 2014/0043939 A1 | 2/2014 | Vasconcelos | |
| 2014/0092708 A1* | 4/2014 | Cotton | G01V 1/20 367/43 |
| 2014/0129479 A1* | 5/2014 | Warner | G01V 1/306 705/348 |
| 2014/0219058 A1* | 8/2014 | Mousa | G01N 29/0672 367/87 |
| 2014/0343859 A1 | 11/2014 | Willis et al. | |
| 2014/0379266 A1* | 12/2014 | Jiao | G01V 1/362 702/17 |
| 2015/0212222 A1 | 7/2015 | Poole | |
| 2015/0241584 A1 | 8/2015 | Aarre | |
| 2015/0316674 A1 | 11/2015 | Deschizeaux | |
| 2016/0245941 A1* | 8/2016 | Ronholt | G01V 1/282 |
| 2016/0291184 A1* | 10/2016 | Coates | G01V 1/282 |
| 2016/0334523 A1* | 11/2016 | Edme | G01V 1/20 |
| 2017/0031047 A1 | 2/2017 | Cheng | |

OTHER PUBLICATIONS

Christoffersson et al., "Wavefield decomposition using ML-probabilities in modelling single-site 3-component records", Geophysical Journal (1988): pp. 197-213. (Year: 1988).*
Pennsylvania State University (PSU), "Seismic Waves adn Earth's Interior" (2001 or 2010): pp. 1-14 (retrieved from http://eqseis.geosc.psu.edu/~cammon/HTML/Classes/IntroQuakes/Notes/waves_and_interior.html) (Year: 2010).*
Wave Field Synthesis principle image retrieved from https://en.wikipedia.org/wiki/Wave_field_synthesis (2019) (Year: 2019).*
Definition of "cross-correlate", Google.com (2019) (Year: 2019).*
Definition of "decompose", Google.com (2019) (Year: 2019).*
Definition of "decompose", http://www.merriam-webster.com (2019) (Year: 2019).*
Definition of "simulate", Google.com (2019) (Year: 2019).*
Michigan Tech University, "How Do I Read a Seismogram?", UPSeis (2007): pp. 1-2 (retrieved from http://www.geo.mtu.edu/UPSeis/reading.html) (Year: 2007).*
Park et al., "Multi-Channel Analysis of Surface Waves (MASW), A summary report of technical aspects, experimental results, and perspective", Kansas Geological Survey (1997): pp. 1-25. (Year: 1997).*
"Oct. 2019 Patent Eligibility Guidance Update": pp. 1-11 (retrieved from https://www.uspto.gov/patent/laws-and-regulations/examination-policy/subject-matter-eligibility) (Year: 2019).*
Almuhaidib et al., "Imaging of near-surface heterogeneities by scattered elastic waves," Geophysics, vol. 80, No. 4, pp. A83-A88, Jul.-Aug. 2015.
Almuhaidib et al., "Suppression of near-surface scattered body-to-surface waves: a steerable and nonlinear filtering approach," European Association of Geoscientists & Engineers: Geophysical Prospecting, 2015, pp. 1-14.
Freeman and Adelson, "The Design and Use of Steerable Filters," IEEE Transaction on Pattern Analysis and Machine Intelligence, vol. 13, No. 9, Sep. 1991, 16 pages.

* cited by examiner

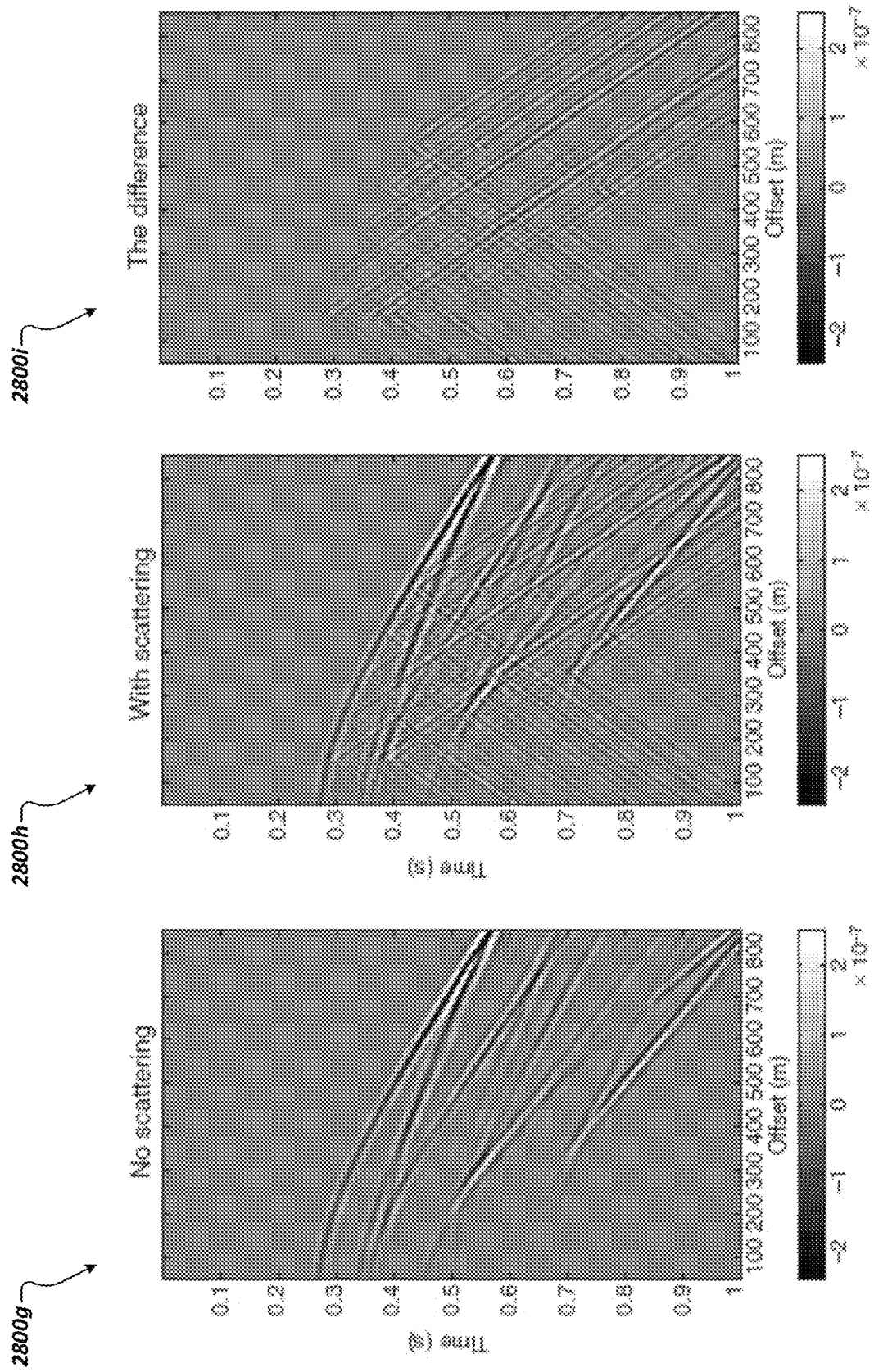

IMAGING SHALLOW HETEROGENEITIES BASED ON NEAR-SURFACE SCATTERED ELASTIC WAVES

CROSS-REFERENCE TO RELATED APPLICATIONS

This application claims the benefit of priority to U.S. Provisional Application Ser. No. 62/155,053, filed on Apr. 30, 2015, and U.S. Provisional Application Ser. No. 62/155,207, filed on Apr. 30, 2015. This application is also related to our reference, U.S. patent application Ser. No. 15/144,169, filed on Monday, May 2, 2016. The entire contents of U.S. Provisional Application Ser. No. 62/155,053, U.S. Provisional Application Ser. No. 62/155,207, and U.S. patent application Ser. No. 15/144,461 are each hereby incorporated by reference in their entirety.

TECHNICAL FIELD

This disclosure relates to exploration seismology and, more specifically, to seismic data processing.

BACKGROUND

Certain types of seismic waves, such as direct and scattered surface (Rayleigh) waves, contain a significant amount of seismic energy. They present great challenges in land seismic data acquisition and processing, especially in arid regions with complex near-surface heterogeneities (for example, dry river beds, wadis/large escarpments, caves, carbonate rocks, karst features, and any abrupt change in the elastic properties of the earth material (for example, velocity and density) not only due to lithology changes but also can be due to other material property variations such as pressure and fluid saturations).

Near-surface scattered body-to-surface waves are typically treated as noise and are not accounted when modeling wave propagation for subsurface imaging. However, they carry important information about the near-surface that cannot be recovered using only reflected wave energy.

SUMMARY

This disclosure relates to imaging and locating near-surface heterogeneities using seismic data, for example, for reservoir analysis of a subterranean region.

In an implementation, scattered body waves are isolated to primary, shear, and surface waves as a receiver wavefield from recorded near-surface scattered wave data generated by scatters. The isolated receiver wavefield is backward propagated through an earth model from a final to an initial state. A source wavefield and the receiver wavefields are cross-correlated. A source wavefield and the receiver wavefields are stacked, over all time steps and sources, to generate a subsurface image. A display of the subsurface image is initiated.

Particular implementations of described methods and systems can include corresponding computer systems, apparatuses, or computer programs (or a combination of computer systems, apparatuses, and computer program) recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, shallow heterogeneities can cause strong scattering of wave propagation (for example, anomalies in the seismic data) and, therefore, can deteriorate the quality of conventional imaging approaches based on reflection data. The described subject matter allows for imaging these shallow heterogeneities and can be used to explain the source of anomalies in the data (for example, scattered waves) and can lead to enhanced conventional subsurface images by incorporating the shallow heterogeneities that are usually not easily resolved or taken into account in the earth model. Second, if heterogeneities can be located using initial 2D seismic surveys, the plan of future 3D surveys within the same area can be used to avoid placing the sources or receivers immediately above the near-surface heterogeneities to improve seismic energy penetration and recording, as the heterogeneities can cause strong attenuation of seismic waves due to scattering and diffraction. Third, images of near-surface scatterers (for example, output data) can explain and account for velocity anomalies in seismic data for enhancing current migration processes, and to avoid shallow drilling hazards or loss of circulations due to karst features or collapses in the near-surface layers. Fourth, in addition to imaging and locating heterogeneities, the described subject matter can be used to predict impedance contrast or relative strength and weakness of elastic properties. Fifth, while the described subject matter is mainly related to seismic exploration applications and is based on elastic wave propagation, the described techniques can be used in applications not only related to earth models (for example, in earthquake seismology, geotechnical engineering, and exploration seismology applications) but also in mechanical engineering applications with elastic waves propagating through different material properties (for example, metals), and on smaller scales (for example, centimeter instead of kilometer scales). Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

FIGS. 3A-C, 3D-F, and 3G-I are time-histories of finite difference simulations showing a vz component, divergence (P-waves), and curl (S-waves), respectively, according to an implementation.

Like reference numbers and designations in the various drawings indicate like elements.

DETAILED DESCRIPTION

Figure 1:
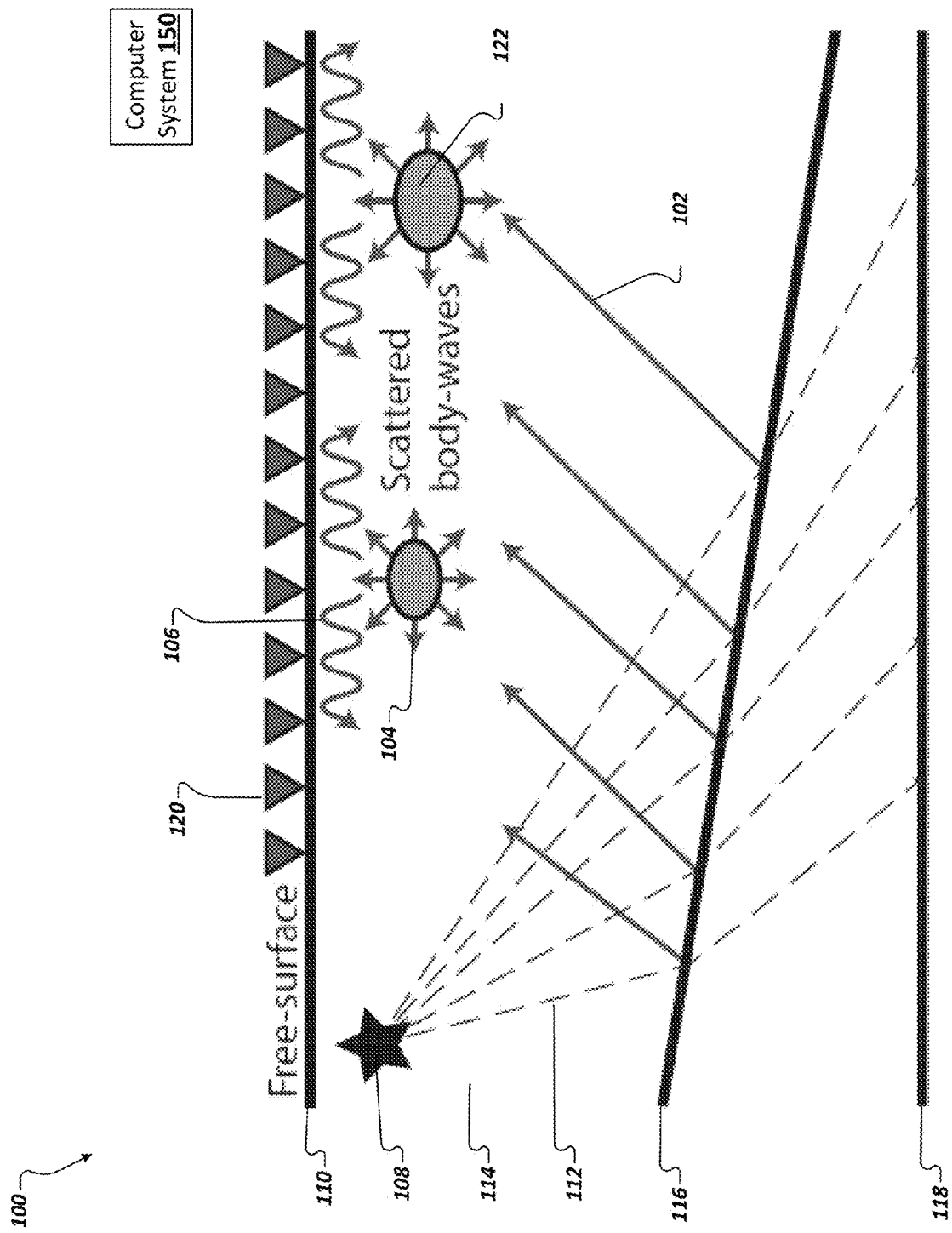
FIG. 1 is a schematic earth model illustrating reflected seismic waves as a source for a reference/source wavefield and a receiver wavefield composed of near-surface scattered waves (corresponding to scattered body waves and surface waves, respectively), according to an implementation.

This disclosure describes computer-implemented methods, software, and systems for imaging and locating near-surface heterogeneities using seismic data by accounting for information contained in near-surface scattered body-to-surface waves when modeling wave propagation for subsurface imaging.

For purposes of this disclosure, "near-surface" refers to the shallowest one wavelength depth from the earth's surface. For example, in case of 30 Hz dominant frequency and 1800 m/s wave speed, the shallowest one wavelength is equivalent to the top 60 m depth from the earth's surface. A "P-wave" denotes a primary or compressional wave, an "S-wave" denotes a secondary or shear wave, and "surface waves" refer to Rayleigh waves that are confined with propagation along the earth's free surface.

The ultimate goal in exploration seismology is to obtain an optimum image of the subsurface to map reservoir boundaries (for example, structural mapping) and to characterize reservoir properties (for example, porosity, saturation, permeability, and fracture density and orientation) for field evaluation and development. Extracting and monitoring reservoir properties are essential steps for reservoir modeling, flow simulation studies and for horizontal drilling to accomplish optimal recovery. These processes can be achieved by inverting formation elastic properties (for example, P-impedance, S-impedance, and density) from seismic data and by using rock physics information derived from core and log data to link between the rock and seismic elastic properties. However, in the real world, many factors affect the quality of seismic data. These factors include near-surface complexity in arid environments (for example, surface topography and near-surface heterogeneities) such as sand dunes, wadis/large escarpments, karsted carbonates, caves, dry river beds, and any abrupt change in the elastic properties of earth material (for example, velocity and density) not only due to lithology changes but also can be due to other material property variations such as pressure and fluid saturations. The near-surface complexities can significantly complicate the data with large static travel time variations, signal attenuation, and wave scattering, which can deteriorate the image quality and increase the uncertainty of subsurface images and formation properties. Determining, locating, and imaging of scatterers are important for deep and shallow reflection imaging for resource exploration and geotechnical site characterization, respectively.

Conventional imaging routines treat elastic scattered waves as noise, as they are not accounted for in the physics of forward modeling simulators that are mostly based on single scattering and acoustic approximations. To date there are no imaging systems that can precisely image and locate near-surface heterogeneities based on near-surface scattered waves without any assumption about the complexity of the background velocity model or the strength of the material property contrast.

In general, depth migration algorithms are categorized as ray-based (for example, high-frequency asymptotic methods and beam migration) and wave-equation-based (for example, one-way and two-way wave-equation-based migrations). The described concept is based on two-way wave equation migration known as reverse time migration (RTM). Although RTM is computationally expensive, it is more attractive than other imaging algorithms because it can handle multiple arrivals and overturned waves, and it has no restrictions with respect to the complexity of the velocity model or the dip of a structure. RTM schemes based on an acoustic-wave equation have been more widely used than elastic RTM for imaging complex geologic structures due to the lower computational cost. The earth, however, is elastic, and the data recorded in the field contains all wave types, including P-wave, S-wave, converted, etc. Current methods are restricted to laterally homogeneous background media consisting of horizontal layers.

To locate and image the near-surface scatterers, the described approach uses a pre-stack, elastic, reverse-time migration (RTM) that utilizes the scattered body-to-surface waves (for example, body to P-, S-, and surface waves), the most sensitive part of the wavefield to near-surface heterogeneities, before an imaging condition is applied. While wavefields (for example in FIG. 1) are shown as generated beneath the free surface, generation of the wavefields can also occur using methods on the free surface (for example, using a vibroseis). For simplicity, only P-wave components (for example, divergence of the wavefields) are used. In exploration seismology, "pre-stack" data refers to seismic data that includes multiple offset/angle traces. Accordingly, a pre-stack elastic RTM approach can handle (or work with) such "pre-stack" seismic data.

The main idea is to separate the near-surface scattered waves from the total recorded wavefield and to use the scattered waves for receiver wavefield extrapolation. An elastic staggered-grid finite-difference scheme is used for wavefield extrapolation. For the P-wave separation (for example, divergence of the wavefield), the finite-difference scheme can be used to calculate the spatial derivatives of the measured wavefields. The P-wave separation is derived after wavefield extrapolation and is subjected to a cross-correlation-type imaging condition. The stresses and particle velocities are migrated simultaneously by solving the first-order elastic-wave equation. For elastic RTM imaging of near-surface scatterers, near-surface scattered waves (for example, body to P-, S-, and surface waves) are backprojected until they are in-phase (for example, time of conversion) with incident waves at the scatterer locations.

The elastic RTM scheme preserves the relative amplitude because all wave propagation losses, including mode conversions, are properly taken into account. The approach back-projects the scattered waves until they are in phase with the incident waves at the scatterer locations. The P-wave components (divergence of the wavefield) are derived from the spatial derivatives of the measured wavefields. The scattered body-to-surface waves travel horizontally along the free surface, and they provide optimal illumination and wavenumber coverage of the near surface when combined with nearly vertical body waves. However, because the surface waves decay exponentially with depth, the heterogeneities that are close to the free surface are better illuminated and imaged by the scattered surface waves.

Modeled waves are typically simulated using computer programs that numerically solve an elastic wave equation with a time-domain finite difference scheme. However, any modeling scheme (for example, finite element, spectral elements, and the like) that can solve the elastic wave equation and takes into account spatial variations of the elastic properties (for example, lateral and vertical variations in velocities and densities of the materials) can be utilized. For a source wavefield, sources are incorporated in the simulation by adding a force term (for example, values of a source time function) to stress components at a cell point placed on the top of the computational grid, to mimic a vibroseis-type field acquisition (for example using a vibrator). For a receiver wavefield, sources are incorporated in the simulation by adding recorded data reversed in time (that is, a separated scattered wavefield) to the particle velocity components at cell points in the computational grid placed at the same locations as the receivers. The recorded data can be computer-simulated data or recorded field data at determined receiver (for example, a geophone) locations.

To form an image, time snapshots of both the forward propagated source and backward propagated receiver wavefields are stored on memory disks for all source locations. Then, all the corresponding time snapshots of the forward and propagated wavefields are cross-correlated and stacked over all time steps and source locations to form an image of the sub-surface.

An earth model is built by assigning values of elastic material properties (for example, primary wave speed, shear wave speed, and density) at each spatial point/cell location in a computational grid. The assigned elastic material property values represent the Earth's geological structures desired to simulate the response of wave propagation through.

While this disclosure emphasizes two-dimensional (2D) earth models (as 2D models are generally more feasible than 3D earth models in terms of the computational efficiency), the described approach can be extended to three-dimensional (3D) models. As will be appreciated by those of ordinary skill in the art, the described techniques are applicable with appropriate modifications to other types of earth models, other dimensionalities, and the like.

FIG. 1 is a schematic earth model 100 illustrating reflected seismic waves 102 as a source for a reference/ source wavefield and a receiver wavefield composed of near-surface scattered waves (corresponding to scattered body waves 104 and surface waves 106, respectively), according to an implementation. The example earth model 100 includes a seismic source 108 (for example, a seismic air-gun or other seismic source) that can emit seismic energy. Although seismic source 108 is illustrated beneath a free surface 110, other implementations can include a seismic source above/on the free surface (for example, a vibroseis). Acoustic waves (for example, body waves 112 generated by the source 108) can travel through the earth 114, be reflected by seismic reflectors (for example, layer boundaries 116 and 118), and be recorded by borehole receivers 120 (for example, geophones) located above free surface 110 or any other place. Although spatial sampling is a typical requirement in recording seismic data, recent advances in data interpolation and regularization can be used to relax this criterion. In some implementations, besides the reflected seismic waves 102, there can be coherent noise (for example, surface waves 106), induced by the scattered body waves 104 caused by scatterers 122. Specifically, the earth model 100 shows scattered surface (Rayleigh) waves 106 excited by direct body waves 112 and upcoming reflected seismic waves 102.

In some implementations, a computer system 150 can be used to acquire seismic data. As described above, the computer system 150 can include one or more computing devices or systems. The computer system 150 or any of its components can be located apart from the other components shown in FIG. 1. For example, the computer system 150 can be located at a data processing center, a computing facility, or another suitable location. The earth model 100 can include additional or different features, and the features of the earth model 100 can be arranged as shown in FIG. 1 or in another configuration.

In a shot-profile domain, an image is constructed by: 1) forward propagating the reference wavefield (modeled data with the estimated source wavelet); 2) back propagating the scattered wavefield (recorded multi-component data) as boundary conditions; and 3) separating the reference and scattered wavefields into P-wave components (that is, divergence of the wavefield) before the imaging condition is applied at each image location. The reference and scattered wavefields are also referred to as the source and receiver wavefields, respectively.

The multi-component source and receiver wavefields are extrapolated in time by solving a seismic elastic-wave equation in isotropic elastic media as:

$$\rho \frac{\partial^2 u}{\partial t^2} - (\lambda + 2\mu)\nabla(\nabla \cdot u) + \mu \nabla \times (\nabla \times u) = f, \tag{1}$$

where, $\rho$ is density, $\lambda$ and $\mu$ are Lamé parameters, u is the displacement vector, and f is a force term (for example, source wavelet or receiver wavefield injected as a boundary condition).

Equation (1) can be separated into scalar and vector potentials by the Helmholtz decomposition which applies to the vector field u:

$$u = \nabla\varphi + \nabla \times \phi, \tag{2}$$

where, $\varphi$ and $\phi$ are the scalar and vector potentials of the wavefield u, respectively.

Substituting equation (2) into equation (1) and applying vector identities gives an equation for a P-wave potential:

$$\nabla^2 \phi - \frac{1}{\alpha^2} \frac{\partial^2}{\partial t^2} \phi = 0 \tag{3}$$

and an S-wave potential:

$$\nabla^2 \varphi - \frac{1}{\beta^2} \frac{\partial^2}{\partial t^2} \varphi = 0, \quad (4)$$

where,

φ is one component of the vector potential in equation (2), and α and β are the P- and S-wave velocities, respectively.

For reverse-time continuation, the data (that is, the separated scattered wavefield) are reversed at the corresponding receiver locations and injected as sources (for example, vx- and vz-components) into the computational domain using an elastic-wave equation solver. The P-wave mode is separated at each wavefield-extrapolation step by taking the divergence of the wavefield ∇u, and an imaging condition is applied to form an image of the scatterers.

Figure 6:
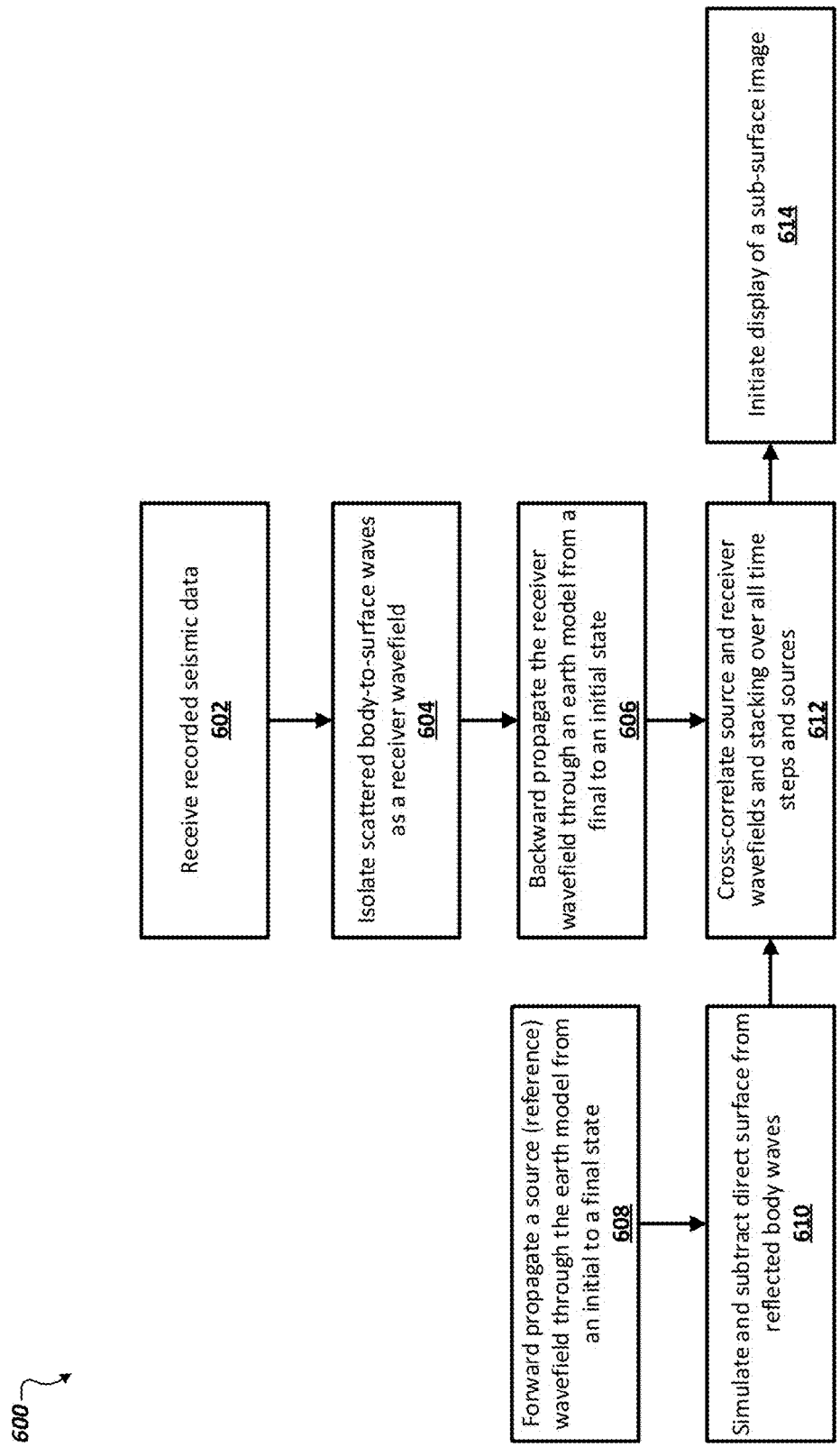
FIG. 6 is a flowchart of an example method for imaging and locating near-surface heterogeneities using seismic data, for example, for reservoir analysis of a subterranean region, according to an implementation.

The cross-correlation imaging condition is defined as follows:

$$m(x) = \Sigma_{shot\ source=1}{}^n \Sigma_0{}^{Tmax} S(x,t) R(x,t) dt, \quad (5)$$

where, m is the value of the migration image at a spatial location x and S and R are the P-wave modes of the forward- and time-reversed wavefields. The imaging condition computes the scalar product of the two wavefields at each time step and summation over all time levels and shot locations. For simplifying the imaging condition, the shear waves are not included by taking the divergence of the wavefield. However, the P-wave component of the Rayleigh waves and upcoming mode-converted reflections (for example, SP, SSP, SPP, and PSP) are incorporated in the imaging condition. The reflections of not only P- but also S-waves from the deeper dipping interfaces provide superior angle coverage. Additionally, the use of the Rayleigh waves plays a key role in broadening the illumination angle to 180 degrees. As illustrated in the workflow of FIG. 6, the source and receiver wavefields are decomposed (for example to the P-wave potential using equation (3) above) before the imaging condition is applied (cross-correlating and stacking over all time steps and sources). The imaging condition computes the scalar product of the two wavefields at each time step and summation over all time levels and shot locations.

Numerical Tests

Figure 2:
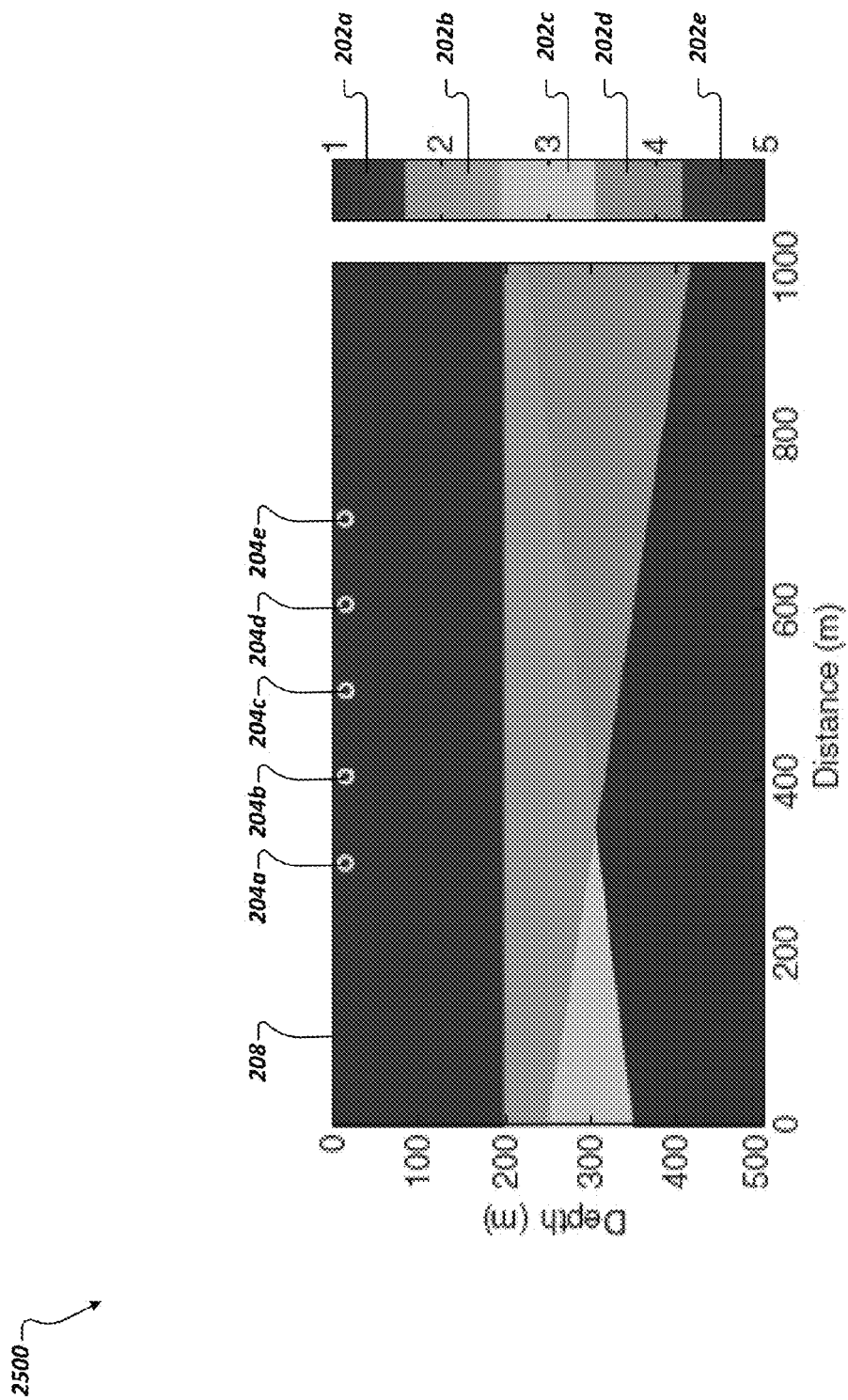
FIG. 2 is an illustration of an example 2D earth model with multiple dipping layers and five scatterers embedded in the uppermost layer, according to an implementation.

Described below is an application of elastic RTM to synthetic data calculated using elastic finite-difference modeling. Turning now to FIG. 2, FIG. 2 is an illustration of an example 2D earth model 200 with multiple dipping layers 202a, 202b, 202c, 202d, and 202e and five scatterers 204a, 204b, 204c, 204d, 204e embedded in the uppermost layer 202a, according to an implementation. In this example 2D earth model 200, the scatterers 204a-e are configured to each have a 10 m diameter, to be located at 15 m depth below a free surface 208 (for example, 110 of FIG. 1), and to have an impedance contrast corresponding to 0.36.

The material properties for the example 2D earth model 200 are given in Table 1:

TABLE 1

Material properties (P-wave velocity α, S-wave velocity β, and density ρ) of the model shown in FIG. 2.

| Material Index | α (m/s) | β (m/s) | ρ (kg/m³) |
|---|---|---|---|
| 1 - Dark blue | 1800 | 1000 | 1750 |
| 2 - Blue | 2200 | 1200 | 1900 |

TABLE 1-continued

Material properties (P-wave velocity α, S-wave velocity β, and density ρ) of the model shown in FIG. 2.

| Material Index | α (m/s) | β (m/s) | ρ (kg/m³) |
|---|---|---|---|
| 3 - Green | 2500 | 1300 | 2000 |
| 4 - Orange | 2700 | 1400 | 2100 |
| 5 - Red | 3000 | 1500 | 2250 |

In this provided example, a vertical point source is used with a Ricker wavelet and 30 Hz center frequency (approximately 75 Hz maximum frequency). The simulations are carried out for nineteen sources located at the surface with a 50 m space interval between each source. The receivers are configured to be at the surface and are placed at intervals of 1 m.

To image the near-surface scatterers, it is assumed that the reflected body-wave arrivals (for example, 102 of FIG. 1) are the reference wavefield (that is, the source wave-field), as the direct body and surface waves are modeled and removed during the wavefield extrapolation. This implies that the interfaces (that is, reflectors, such as 122 of FIG. 1) act as seismic sources for the incident waves (for example, 104 of FIG. 1) on the scatterers.

The receiver wavefield (that is, reflected body waves scattered to body and surface waves) is obtained by first modeling and then subtracting the reference wavefield from the total wavefield. Turning now to FIGS. 3A-C, 3D-F, and 3G-I, FIGS. 3A-C, 3D-F, and 3G-I are time-histories of finite difference simulations 300a-300i showing a vz component, divergence (P-waves), and curl (S-waves), respectively, according to an implementation. Note, as described above and below, the divergence decomposition of the wavefield (equation (3)) separates the P-wave component of the data, the curl decomposition of the wavefield (equation (4)) separates the S-wave component of the data, and the P-wave component is utilized in equation (5) and in step 612 in FIG. 6.

Figures 3A, 3B, 3C:
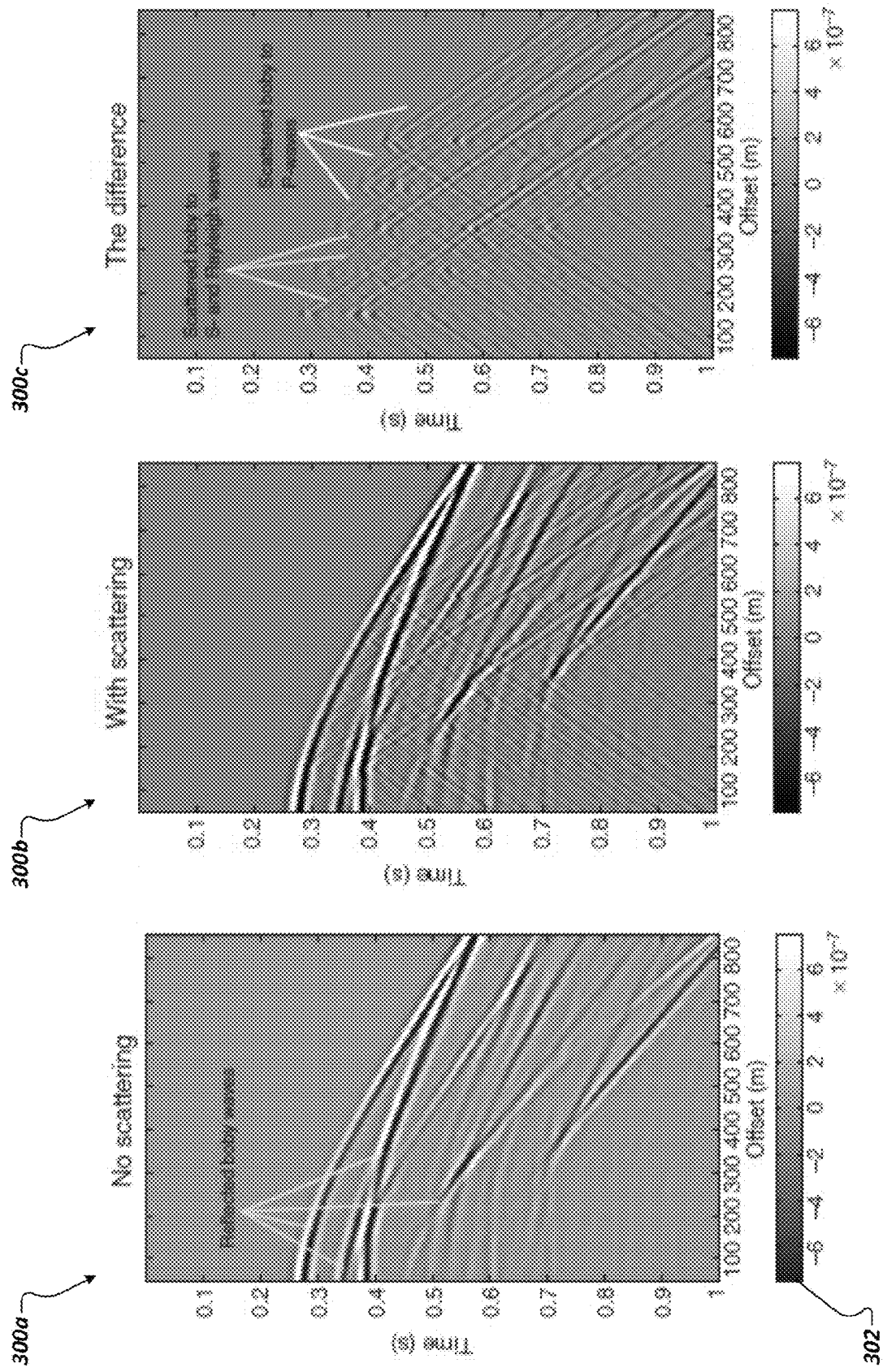
Figures 3D, 3E, 3F:
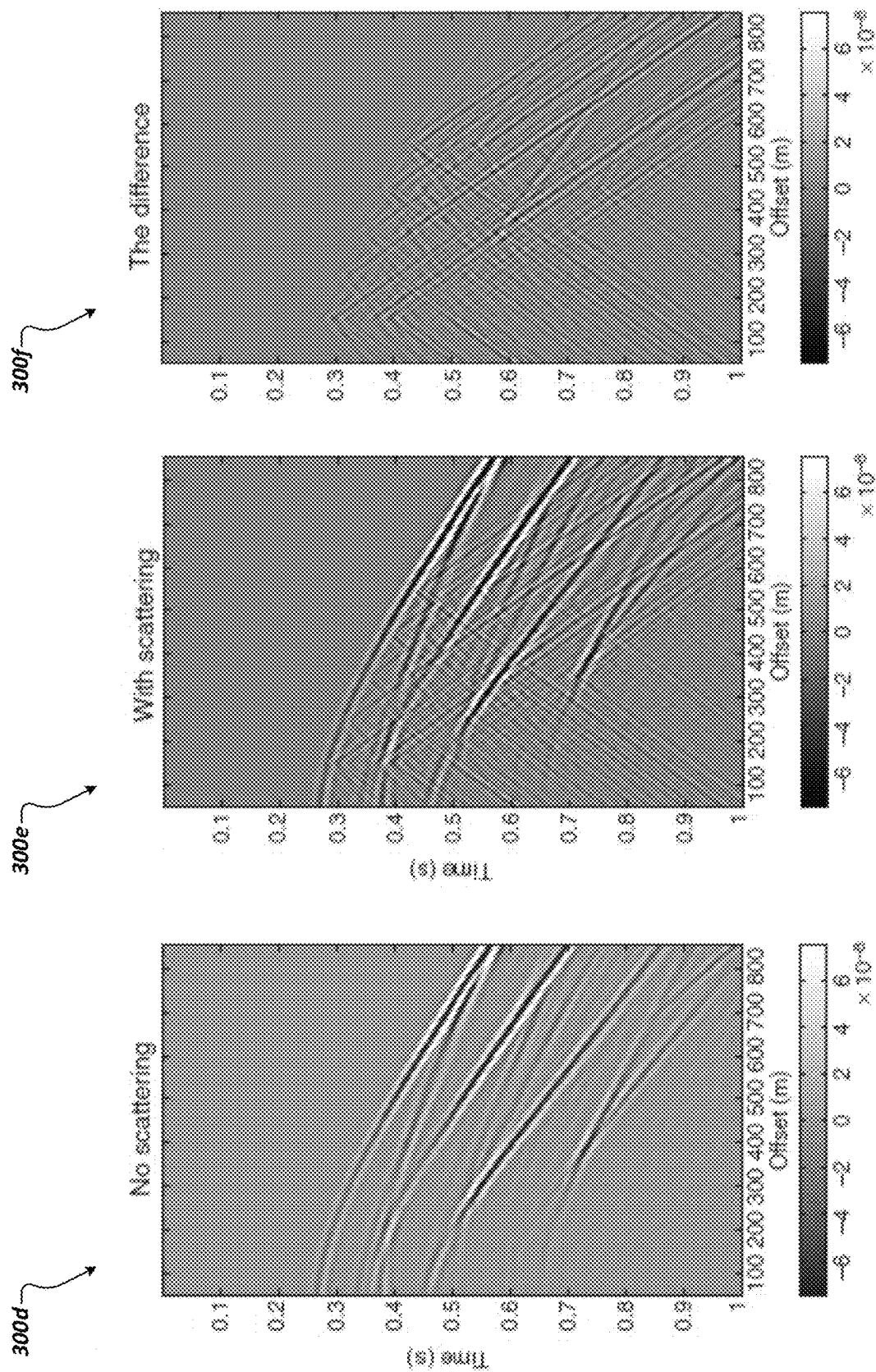

FIGS. 3A, 3D, and 3G illustrate a reference wavefield simulated using a model without scatterers (for example, 122 of FIG. 1). FIGS. 3B, 3E, and 3H illustrate a total wavefield simulated using a model with scatterers (for example, 122 of FIG. 1). FIGS. 3C, 3F, and 3I illustrate a scattered wavefield. The scales (for example, as indicated by 302 of FIG. 3A) at the bottom of each of FIGS. 3A-C, 3D-F, and 3G-I indicate amplitudes. In each of FIGS. 3A-C, 3D-F, and 3G-I, a seismic source is configured to be at (x, z)=(150 m, 0 m).

Figure 4A:
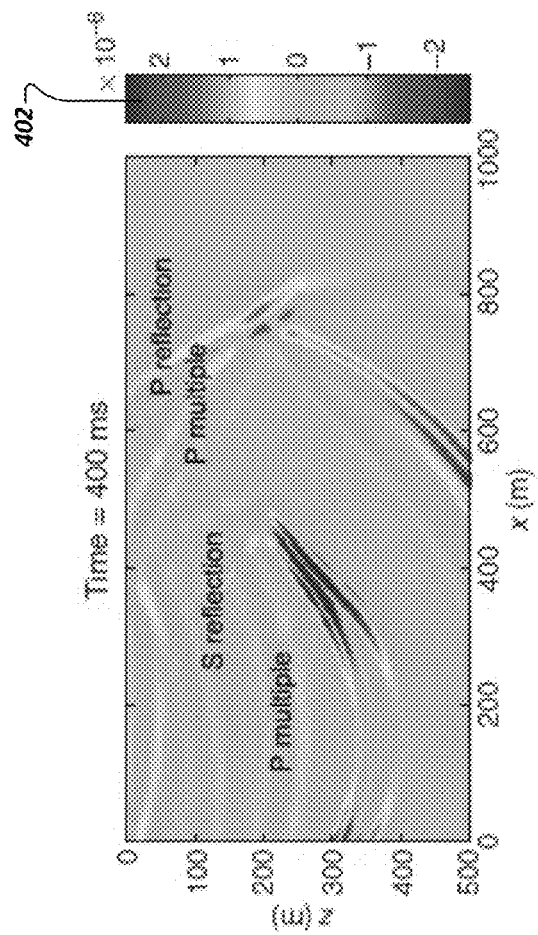
FIGS. 4A-B, 4C-D, and 4E-F are model snapshots of the vz-component, divergence (P-waves), and curl (S-waves), respectively, of the incident and scattered waves, according to an implementation.
Figure 4B:
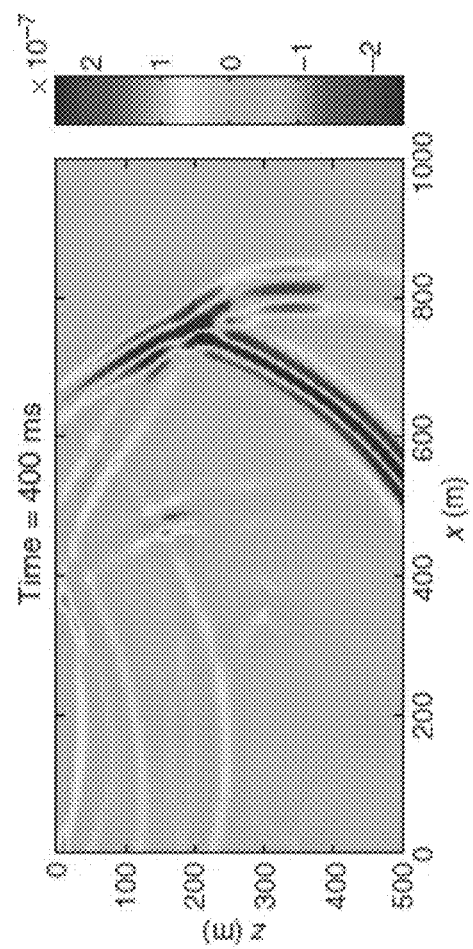
Figure 4C:
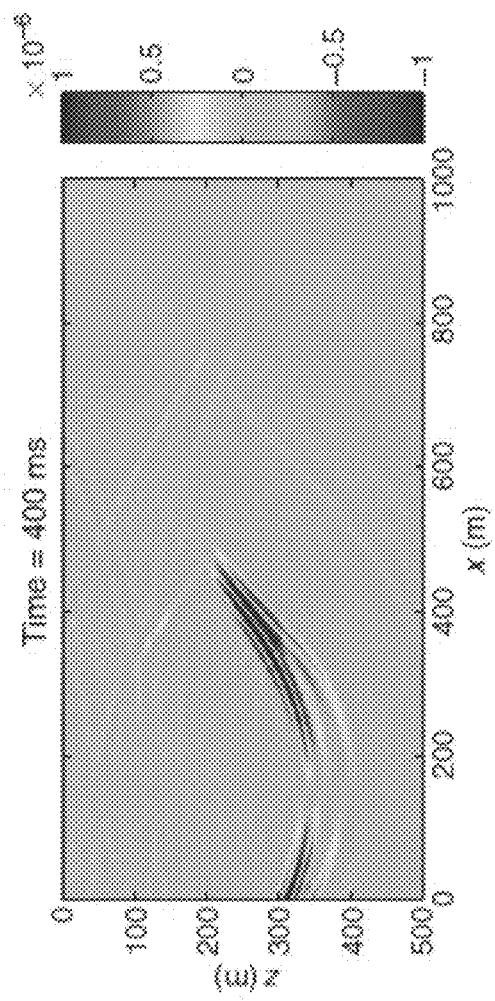
Figure 4D:
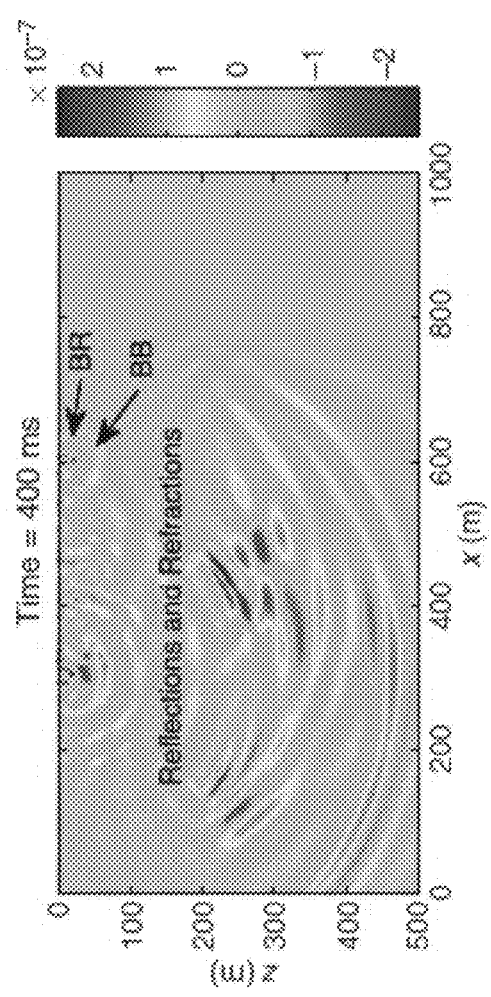
Figure 4E:
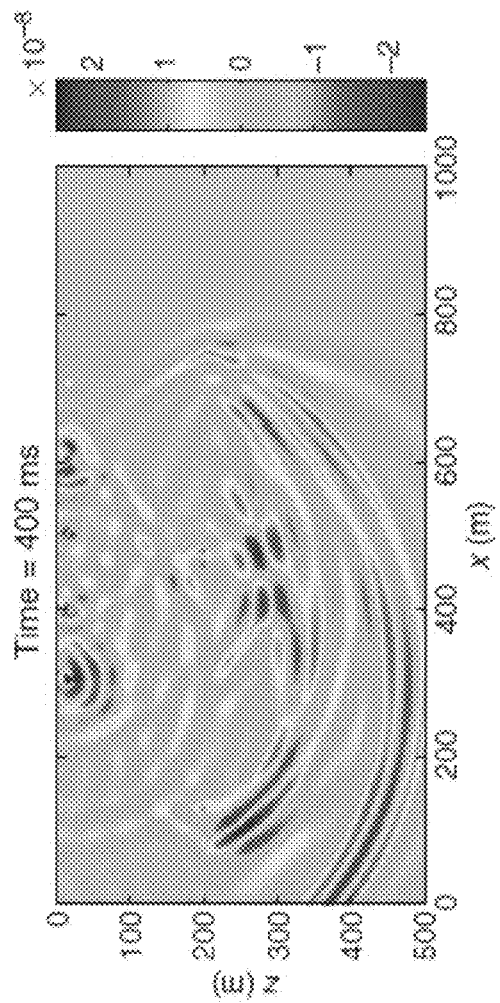
Figure 4F:
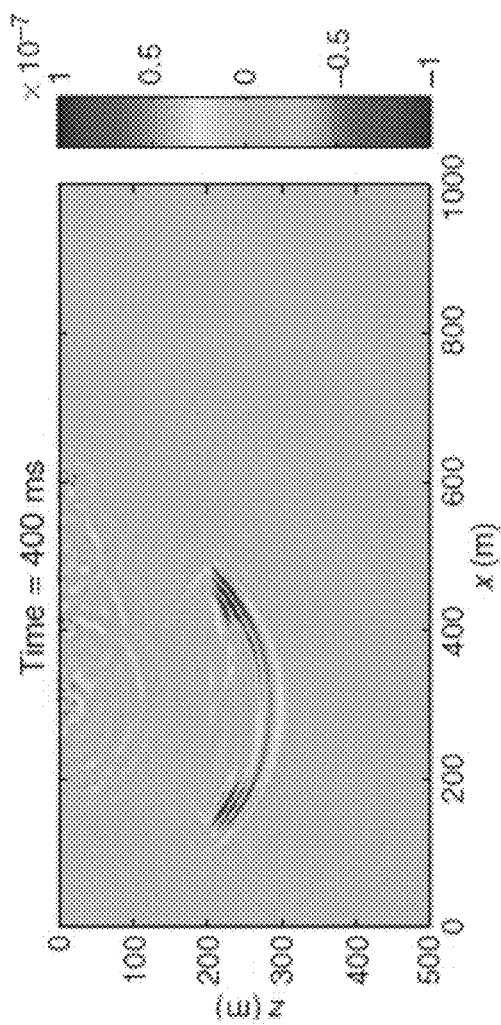

Turning now to FIGS. 4A-B, 4C-D, and 4E-F, FIGS. 4A-B, 4C-D, and 4E-F are model snapshots 400a-400f of the vz-component, divergence (P-waves), and curl (S-waves), respectively, of the incident and scattered waves, according to an implementation. FIGS. 4A, 4C, and 4E illustrate reference wavefields. FIGS. 4B, 4D, and 4F illustrate scattered wavefields. In each of FIGS. 4A-B, 4C-D, and 4E-F, a seismic source is configured to be at (x, z)=(150 m, 0 m). The source of scattering (for example, scatterers 122 of FIG. 1) is reflected or refracted body waves. The scatterers excite primary, shear and, also, surface waves due to the proximity to the free surface. BB and BR in panel (c) refer to scattered body-to-body and body-to-Rayleigh waves, respectively. Note that the scattered surface-to-surface waves are removed. For clarity, the color scales (for example, as indicated by 402 of FIG. 4A) at the side of each of FIGS.

4A-4F of the scattered wavefield plots are enhanced by an order of magnitude compared with their corresponding incident wavefield plots.

The model snapshots illustrate wavefield decomposition into P- and S-waves by applying divergence and curl operators. However, it is difficult to identify the separated phases in the shot-gather domain in the case of surface receivers. This is due to mode conversion occurring right at the free surface (for example, free surface 110 of FIG. 1) where the receivers are placed. For example, we can observe weak S-waves in the shot-gather domain (the curl of the wavefield as shown in FIG. 3I) recorded with similar slopes to the P-wave arrivals. These wave phases are scattered P-waves converted to S-waves right at the free-surface boundary. The same is also true in the case of the scattered S-wave arrivals converted to P-waves at the free surface and recorded with similar slopes to the S-wave phases (as shown by the divergence of the wavefield in FIG. 3F).

Figure 5A:
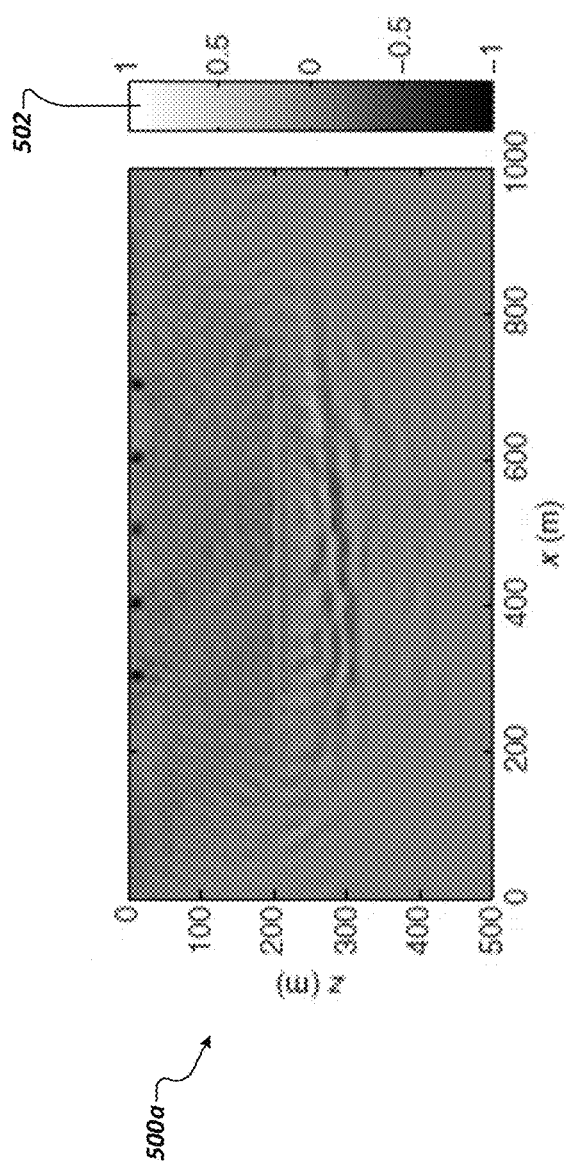
FIGS. 5A-5D are subsurface model images of illustrated elastic RTM of near-surface scattered waves with receivers placed on a surface, according to an implementation.
Figure 5B:
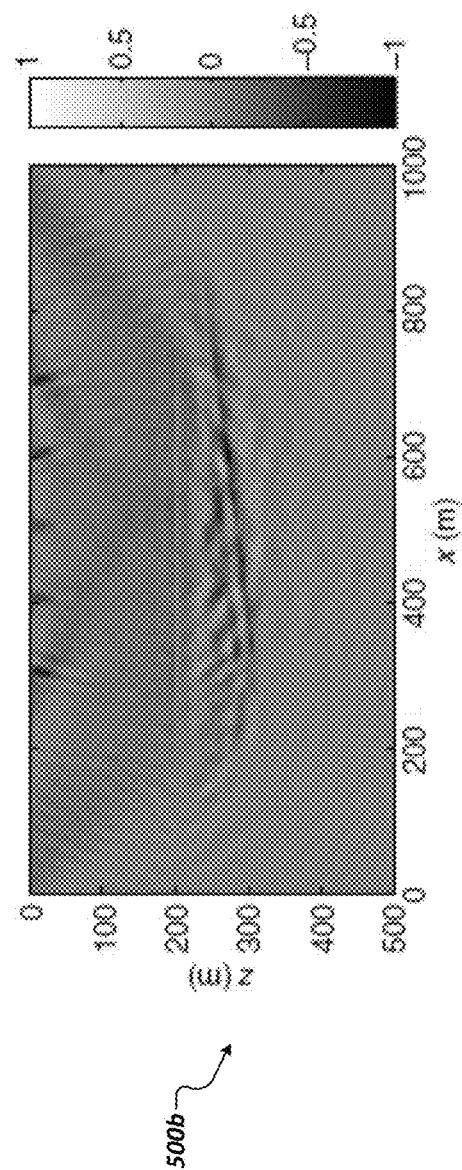
Figure 5C:
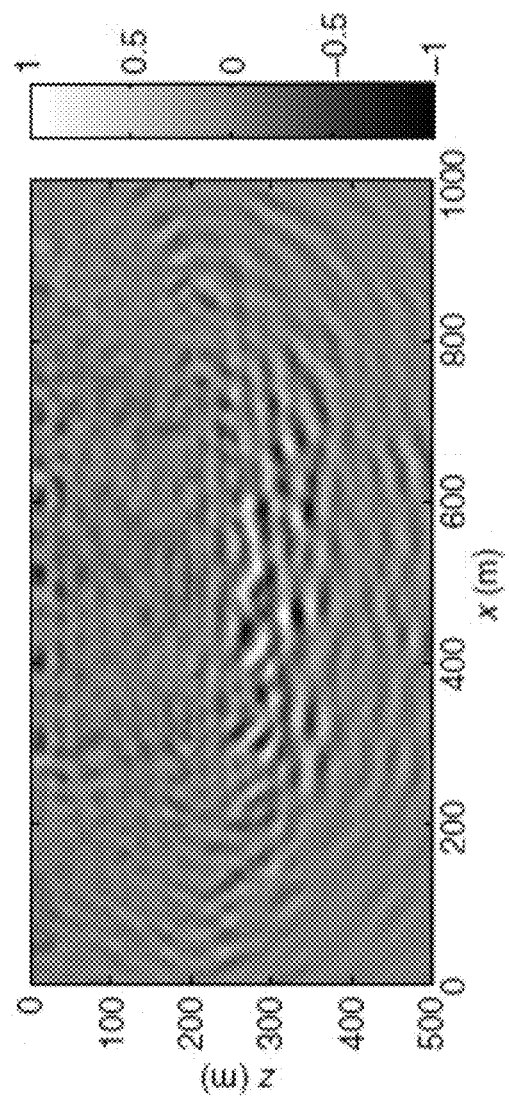
Figure 5D:
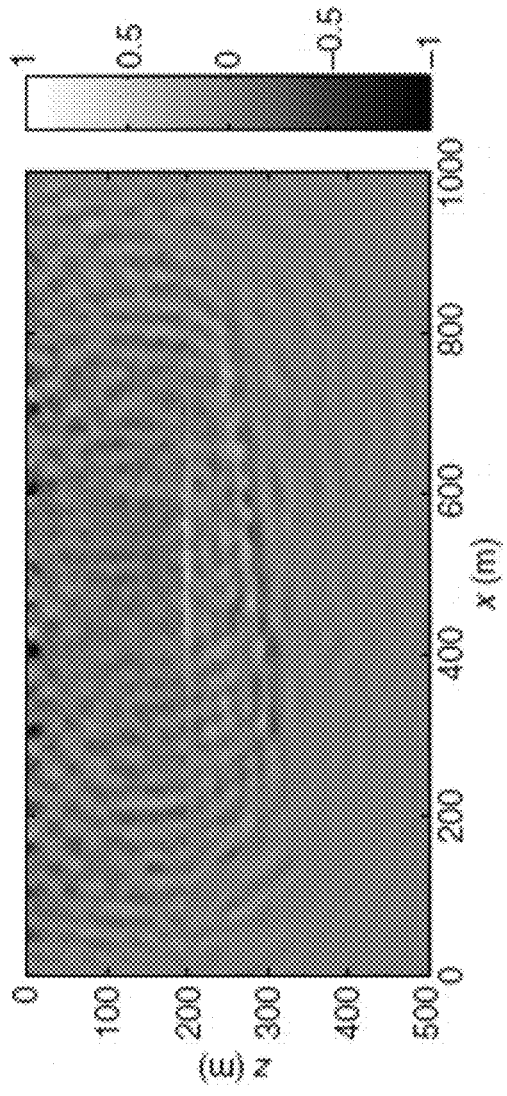

Turning now to FIGS. 5A-5D, FIGS. 5A-5D are subsurface model images 500a-500d of illustrated elastic RTM of near-surface scattered waves with receivers placed on a surface. In particular, FIG. 5A illustrates imaging near-surface scattered body to P-, S-, and surface waves, FIG. 5B illustrates imaging without free-surface multiples and only included scattered body-to-body waves (for example, the recorded scattered wavefield is modeled with an absorbing boundary at the surface), FIG. 5C illustrates the same as FIG. 5A but with almost 10% error in the upper layer's velocity (for example, $\alpha=2000$ m/s and $\beta=1100$ m/s instead of $\alpha=1800$ m/s and $\beta=1000$ m/s), and FIG. 5D illustrates imaging with back-scattered Rayleigh-to-Rayleigh waves included. The scales (for example, as indicated by 502 of FIG. 5A) at the side of each of FIGS. 5A-5D indicate normalized amplitudes.

As illustrated in FIG. 5A, a near-surface scatterers' image is formed by applying the imaging condition (equation (5) above) to the P-wave components of the extrapolated forward reference and backward-scattered wavefields stored at each time step. The wavefield extrapolation is carried out using a velocity model (with no a priori information of the scatterers in some implementations), and the image is constructed when the near-surface scattered waves are in-phase with the incident waves at the scatterer locations. All the scatterers are imaged and located accurately. Because the reflected signal is used as the source wavefield, the subsurface interfaces as expected, are not accurately imaged by RTM. The only exceptions, however, are very weak scattered body-to-body waves reflected from the deep interfaces and recorded on the surface. These recorded phases can slightly contribute to imaging the deep reflectors. In general, artifacts in the RTM image can be due to many factors, including the imaging condition, injection of the receiver wavefield as a boundary condition for backward extrapolation, and the one-sided coverage of the receivers.

FIG. 5B illustrates that the image can be distorted due to a limited illumination aperture in the case where the recorded scattered wavefield is simulated with an absorbing boundary at the surface (in which free-surface multiples and scattered body-to-surface waves are not included in the imaging process).

FIG. 5C illustrates that a precise depth image depends on the ability to accurately estimate a subsurface velocity model, especially for field data. As shown in FIG. 5C, small errors in the velocity model can significantly defocus the image results. In such cases, updating the velocity model based on least-square migration (LSM) or a waveform inversion can be useful to mitigate resultant artifacts in the RTM image.

FIG. 5D illustrates that a near-surface scatter's image can be distorted with artifacts in the case of incomplete separation of backscattered Rayleigh-to-Rayleigh waves. However, scattered surface waves exhibit different slopes than body-wave reflections (for example, the backscattered Rayleigh-to-Rayleigh waves are excited with large amplitudes and low frequencies), which make them easier to separate (for example, using a velocity filter as a basis for their suppression) for subsurface imaging when a particular velocity model is not accurately estimated. A data-based approach is used to separate the scattered surface waves based on laterally varying local slopes.

Body-to-body scattered waves, in general, require illumination from all angles (that is, receivers surrounding the computational domain) to achieve true relative amplitude migration. In contrast, scattered body-to-surface waves travel horizontally along the free surface and attenuate less with distance than body waves. Therefore, they are recorded by all receivers on the surface and provide optimal illumination of the near-surface layers. However, because the amplitude of surface waves decays exponentially with depth, only near-surface heterogeneities that are close to the free surface (for example, shallower than one wavelength) can be illuminated and imaged by the scattered body-to-surface waves. As a result, the intensity of the imaged scatterers with scattered surface waves decreases with depth, and therefore, body-to-body-wave scattering contributes more to the image.

As will be appreciated by those of ordinary skill in the art, the above-proposed imaging approach can be extended to 3D problems. As a result, the proposed imaging approach can find important applications, among other things, in seismic imaging, survey planning, and geotechnical site characterization.

FIG. 6 is a flowchart of an example method 600 for imaging and locating near-surface heterogeneities using seismic data, for example, for reservoir analysis of a subterranean region, according to an implementation. For clarity of presentation, the description that follows generally describes method 600 in the context of the other figures in this description. However, it will be understood that method 600 may be performed, for example, by any suitable system, environment, software, and hardware, or a combination of systems, environments, software, and hardware as appropriate. In some implementations, various steps of method 600 can be run in parallel, in combination, in loops, or in any order.

At 602, recorded seismic data is received. From 602, method 600 proceeds to 604.

At 604, scattered body-to-surface waves are isolated as a receiver wavefield. Any proprietary, conventional, or combination or proprietary and conventional filtering method can be used to isolate the scattered body-to-surface waves. From 604, method 600 proceeds to 606.

At 606, the receiver wavefield is backward propagated through an earth model from a final to an initial state using equation (1) as described above. In some implementations, the backward propagation can be performed with no a priori information of the scatters. From 606, method 600 proceeds to 608.

At 608, a source (reference) wavefield is forward propagated through the earth model of 606 from an initial to a final state using equation (1) as described above. In some implementations, the forward propagation can be performed with no a priori information of the scatters. From 608, method 600 proceeds to 610.

At 610, a direct surface wave is simulated and separated from reflected body waves. A wavefield is simulated using equation (1) for a model with only a single background velocity equivalent to the shallowest layer (for example, a homogeneous full-space earth model), then subtracted from the result of 608 above. Note that this model is equivalent as that described in FIG. 2, but where all layers are replaced with the properties of the shallowest layer. From 610, method 600 proceeds to 612.

At 612, the results of 606 and 610 are decomposed using equation (3) and cross-correlated and stacked over all time steps and sources using equation (5). From 612, method 600 proceeds to 614.

At 614, display of a sub-surface image is initiated, for example on a graphical user interface. After 614, method 600 stops.

Figure 7:
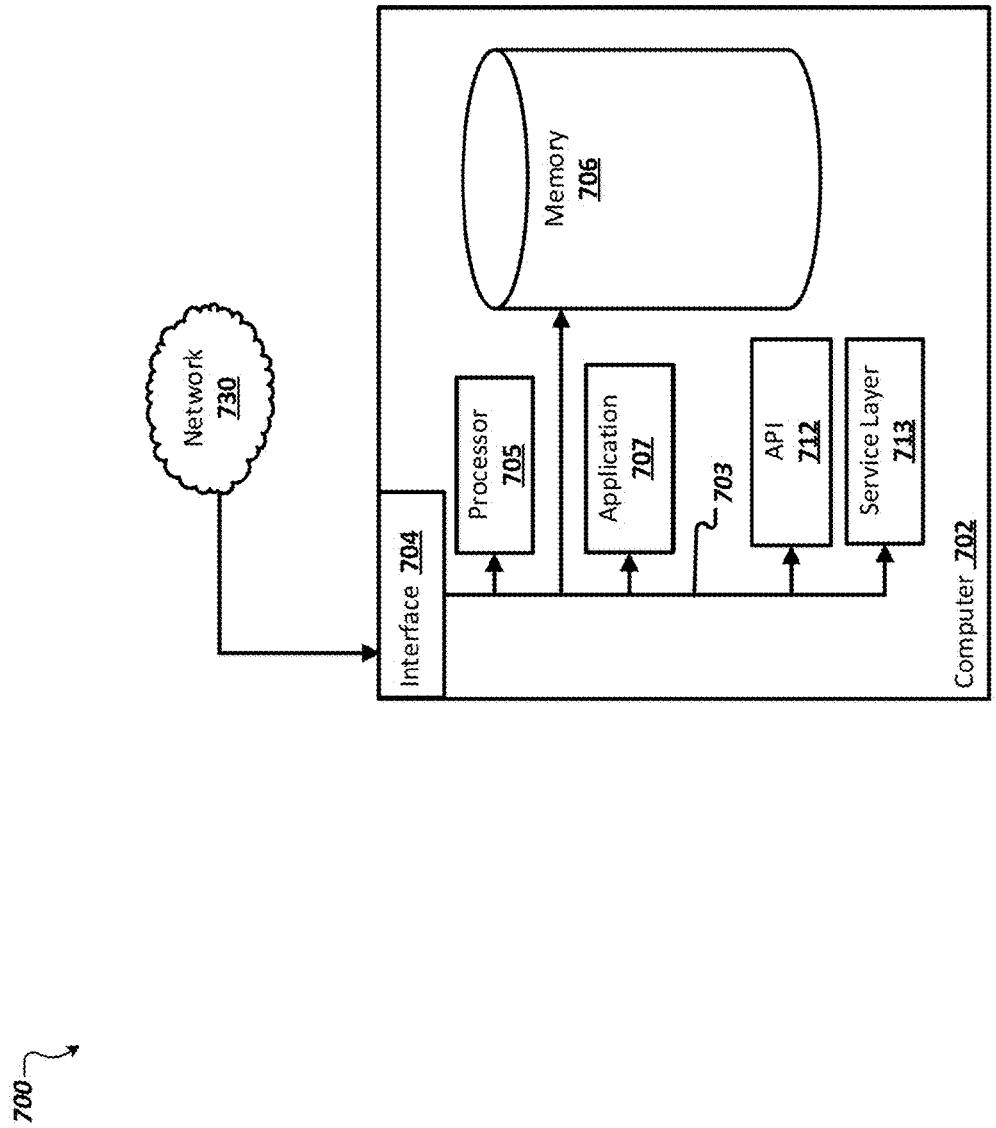
FIG. 7 is a block diagram illustrating an example computer used to provide computational functionalities associated with described algorithms, methods, functions, processes, flows, and procedures as described in the instant disclosure, according to an implementation.

FIG. 7 is a block diagram 700 illustrating an example computer (for example, computer system 150 of FIG. 1A) used to provide computational functionalities associated with described algorithms, methods, functions, processes, flows, and procedures as described in the instant disclosure, according to an implementation. The example computer system 150 can be located at or near one or more well survey systems or at a remote location.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

Described implementations of the subject matter can include one or more features, alone or in combination.

For example, in a first implementation, a computer-implemented method for imaging and locating near-surface heterogeneities, comprising: isolating scattered body to primary, shear, and surface waves as a receiver wavefield from recorded near-surface scattered wave data generated by scatters; backward-propagating the isolated receiver wavefield through an earth model from a final to an initial state; cross-correlating a source wavefield and the receiver wavefields; stacking, over all time steps and sources, a source wavefield and the receiver wavefields to generate a subsurface image; and initiating display of the subsurface image.

The foregoing and other described implementations can each optionally include one or more of the following features:

A first feature, combinable with any of the following features, further comprising forward propagating the source wavefield through the earth model from an initial to a final state.

A second feature, combinable with any of the previous or following features, further comprising simulating and separating a direct surface from reflected body waves.

A third feature, combinable with any of the previous or following features, wherein near-surface means the shallowest one wavelength depth from the earth's surface.

A fourth feature, combinable with any of the previous or following features, wherein the source wavefield and the receiver wavefield are each decomposed before the imaging condition is applied.

A fifth feature, combinable with any of the previous or following features, wherein the recorded data is recorded in a un-aliased manner for spatial sampling of data along a space axis.

A sixth feature, combinable with any of the previous or following features, wherein the spatial sampling is given by a Nyquist sampling limit given by the formula ($dx \leq v/(2*f_{max})$), where dx denotes receiver space interval, v denotes minimum shear wave speed, and $f_{max}$ denotes the maximum shear wave frequency in the data.

In a second implementation, a non-transitory, computer-readable medium storing one or more instructions executable by a computer system to perform operations for imaging and locating near-surface heterogeneities, comprising: isolating scattered body to primary, shear, and surface waves as a receiver wavefield from recorded near-surface scattered wave data generated by scatters; backward-propagating the isolated receiver wavefield through an earth model from a final to an initial state; cross-correlating a source wavefield and the receiver wavefields; stacking, over all time, steps, and sources, a source wavefield and the receiver wavefields to generate a subsurface image; and initiating display of the subsurface image.

The foregoing and other described implementations can each optionally include one or more of the following features:

A first feature, combinable with any of the following features, further comprising one or more instructions to forward propagate the source wavefield through the earth model from an initial to a final state.

A second feature, combinable with any of the previous or following features, further comprising one or more instructions to simulate and separate a direct surface from reflected body waves.

A third feature, combinable with any of the previous or following features, wherein near-surface means the shallowest one wavelength depth from the earth's surface.

A fourth feature, combinable with any of the previous or following features, wherein the source wavefield and the receiver wavefield are each decomposed before an imaging condition is applied.

A fifth feature, combinable with any of the previous or following features, wherein the recorded data is recorded in a un-aliased manner for spatial sampling of data along a space axis.

A sixth feature, combinable with any of the previous or following features, wherein the spatial sampling is given by a Nyquist sampling limit given by the formula ($dx \leq v/(2*f_{max})$), where dx denotes receiver space interval, v denotes minimum shear wave speed, and $f_{max}$ denotes the maximum shear wave frequency in the data.

In a third implementation, a computer-implemented system to perform operations for imaging and locating near-surface heterogeneities, comprising: a computer memory operable to store recorded near-surface scattered wave data generated by scatters; and a data processing apparatus interoperably coupled with the computer memory and configured to: isolate scattered body to primary, shear, and surface waves as a receiver wavefield from recorded data; backward-propagate the isolated receiver wavefield through an earth model from a final to an initial state; cross-correlate a source wavefield and the receiver wavefields; stack, over all time, steps and sources a source wavefield and the receiver wavefields to generate a subsurface image; and initiate display of the subsurface image.

The foregoing and other described implementations can each optionally include one or more of the following features:

A first feature, combinable with any of the following features, configured to: forward propagate the source wavefield through the earth model from an initial to a final state; and simulate and separate a direct surface from reflected body waves.

A second feature, combinable with any of the previous or following features, wherein near-surface means the shallowest one wavelength depth from the earth's surface.

A third feature, combinable with any of the previous or following features, wherein the source wavefield and the receiver wavefield are each decomposed before an imaging condition is applied.

A fourth feature, combinable with any of the previous or following features, wherein the recorded data is recorded in a un-aliased manner for spatial sampling of data along a space axis.

A fifth feature, combinable with any of the previous or following features, wherein the spatial sampling is given by a Nyquist sampling limit given by the formula ($dx \leq v/(2*f_{max})$), where dx denotes receiver space interval, v denotes minimum shear wave speed, and $f_{max}$ denotes the maximum shear wave frequency in the data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for imaging and locating near-surface heterogeneities, the method comprising:
   receiving near-surface scattered wave data generated by scatterers at an earth near-surface that scatter reflected or refracted body waves;
   isolating, from the near-surface scattered wave data, scattered reflected or refracted body-to-primary, reflected or refracted body-to-shear, and reflected or refracted body-to-surface waves as a receiver wavefield;
   backward-propagating the isolated receiver wavefield through an earth model until they are in-phase with incident waves at locations of the scatterers;
   forward propagating a source wavefield through the earth model;
   cross-correlating the source wavefield and the isolated receiver wavefield;
   stacking, over all time steps and sources, the source wavefield and the isolated receiver wavefield to generate a subsurface image that includes an image of the scatterers; and
   initiating display of the subsurface image that includes the image of the scatterers.

2. The computer-implemented method of claim 1, wherein forward propagating the source wavefield through the earth model comprises forward propagating the source wavefield through the earth model from an initial to a final state.

3. The computer-implemented method of claim 2, further comprising simulating and separating a direct surface from reflected body waves.

4. The computer-implemented method of claim 1, wherein near-surface means the shallowest one wavelength depth from the earth's surface.

5. The computer-implemented method of claim 1, wherein the source wavefield and the receiver wavefield are each decomposed before an imaging condition is applied.

6. The computer-implemented method of claim 1, wherein the recorded data is recorded in a un-aliased manner for spatial sampling of data along a space axis.

7. The computer-implemented method of claim 6 wherein the spatial sampling is given by a Nyquist sampling limit given by the formula $(dx \leq v/(2*f_{max}))$, where dx denotes receiver space interval, v denotes minimum shear wave speed, and $f_{max}$ denotes the maximum shear wave frequency in the data.

8. A non-transitory, computer-readable medium storing one or more instructions executable by a computer system to perform operations for imaging and locating near-surface heterogeneities, comprising:
   receiving near-surface scattered wave data generated by scatterers at an earth near-surface that scatter reflected or refracted body waves;
   isolating, from the near-surface scattered wave data, scattered reflected or refracted body-to-primary, reflected or refracted body-to-shear, and reflected or refracted body-to-surface waves as a receiver wavefield;
   backward-propagating the isolated receiver wavefield through an earth model until they are in-phase with incident waves at locations of the scatterers;
   forward propagating a source wavefield through the earth model;
   cross-correlating the source wavefield and the isolated receiver wavefield;
   stacking, over all time steps and sources, the source wavefield and the isolated receiver wavefield to generate a subsurface image that includes an image of the scatterers; and
   initiating display of the subsurface image that includes the image of the scatterers.

9. The non-transitory computer-readable medium of claim 8, wherein forward propagating the source wavefield through the earth model comprises forward propagating the source wavefield through the earth model from an initial to a final state.

10. The non-transitory computer-readable medium of claim 9, further comprising one or more instructions to simulate and separating a direct surface from reflected body waves.

11. The non-transitory computer-readable medium of claim 8, wherein near-surface means the shallowest one wavelength depth from the earth's surface.

12. The non-transitory computer-readable medium of claim 8, wherein the source wavefield and the receiver wavefield are each decomposed before an imaging condition is applied.

13. The non-transitory computer-readable medium of claim 8, wherein the recorded data is recorded in a un-aliased manner for spatial sampling of data along a space axis.

14. The non-transitory computer-readable medium of claim 13, wherein the spatial sampling is given by a Nyquist sampling limit given by the formula $(dx \leq v/(2*f_{max}))$, where dx denotes receiver space interval, v denotes minimum shear wave speed, and $f_{max}$ denotes the maximum shear wave frequency in the data.

15. A computer-implemented system to perform operations for imaging and locating near-surface heterogeneities, comprising:
   a computer memory operable to store recorded near-surface scattered wave data generated by scatters; and
   a data processing apparatus interoperably coupled with the computer memory and configured to:
      receive near-surface scattered wave data generated by scatterers at an earth near-surface that scatter reflected or refracted body waves;
      isolate, from the near-surface scattered wave data, scattered reflected or refracted body-to-primary, reflected or refracted body-to-shear, and reflected or refracted body-to-surface waves as a receiver wavefield;
      backward-propagate the isolated receiver wavefield through an earth model until they are in-phase with incident waves at locations of the scatterers;
      forward propagate a source wavefield through the earth model;
      cross-correlate the source wavefield and the isolated receiver wavefield;
      stack, over all time steps and sources, the source wavefield and the isolated receiver wavefield to generate a subsurface image that includes an image of the scatterers; and
      initiate display of the subsurface image that includes the image of the scatterers.

16. The computer-implemented system of claim 15, wherein forward propagating the source wavefield through the earth model comprises forward propagating the source wavefield through the earth model from an initial to a final state, and wherein the computer-implemented system is further configured to:
  simulate and separate a direct surface from reflected body waves.

17. The computer-implemented system of claim 16, wherein near-surface means the shallowest one wavelength depth from the earth's surface.

18. The computer-implemented system of claim 15, wherein the source wavefield and the receiver wavefield are each decomposed before an imaging condition is applied.

19. The computer-implemented system of claim 15, wherein the recorded data is recorded in a un-aliased manner for spatial sampling of data along a space axis.

20. The computer-implemented system of claim 19, wherein the spatial sampling is given by a Nyquist sampling limit given by the formula ($dx \leq v/(2*f_{max})$), where $dx$ denotes receiver space interval, $v$ denotes minimum shear wave speed, and $f_{max}$ denotes the maximum shear wave frequency in the data.

* * * * *